United States Patent [19]
Soriano

[11] 4,361,340
[45] Nov. 30, 1982

[54] GROCERY BASKET WITH ANTI-THEFT COMPARTMENT

[76] Inventor: Jorge H. Soriano, 608 Kave, National City, Calif. 92050

[21] Appl. No.: 205,885

[22] Filed: Nov. 10, 1980

[51] Int. Cl.³ .............................................. B62B 3/02
[52] U.S. Cl. ............................................... 280/33.99 A
[58] Field of Search ................. 280/33.99 R, 33.99 A, 280/33.99 B, 33.99 C, DIG. 4

[56] References Cited

U.S. PATENT DOCUMENTS

| | | | |
|---|---|---|---|
| 2,558,372 | 6/1951 | Nidermayer | 280/33.99 A |
| 2,813,725 | 11/1957 | Hoedinghaus et al. | 280/33.99 B |
| 2,997,311 | 8/1961 | Umanoff | 280/33.99 B |
| 3,093,385 | 6/1963 | Thompson | 280/33.99 B |

FOREIGN PATENT DOCUMENTS

| | | | |
|---|---|---|---|
| 2325685 | 12/1974 | Fed. Rep. of Germany | 280/33.99 A |
| 2264856 | 4/1975 | Fed. Rep. of Germany | 280/33.99 A |
| 2310251 | 12/1976 | France | 280/33.99 A |

*Primary Examiner*—David M. Mitchell
*Attorney, Agent, or Firm*—Ralph S. Branscomb

[57] ABSTRACT

A modification of a grocery cart is provided, which could be retrofitted on an existing cart, and which defines an enclosed compartment for the temporary containment of valuables such as purses or wallets, there being two basic embodiments to accommodate both traditional grocery carts which nest from the rear and have rear grids that swing forwardly, and the newer waist level type carts having a front portion which pivots upwardly over a rear portion.

2 Claims, 14 Drawing Figures

U.S. Patent  Nov. 30, 1982  Sheet 1 of 2  4,361,340
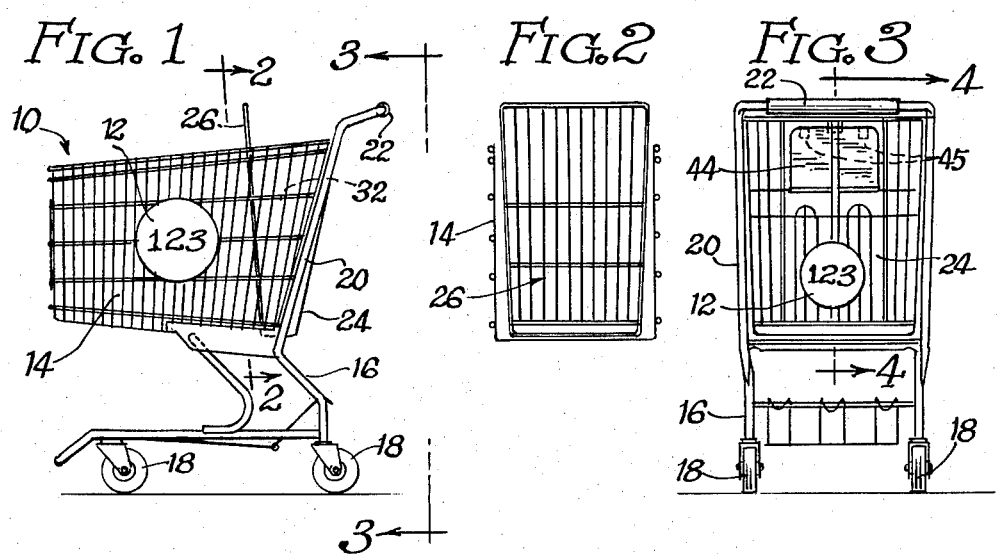
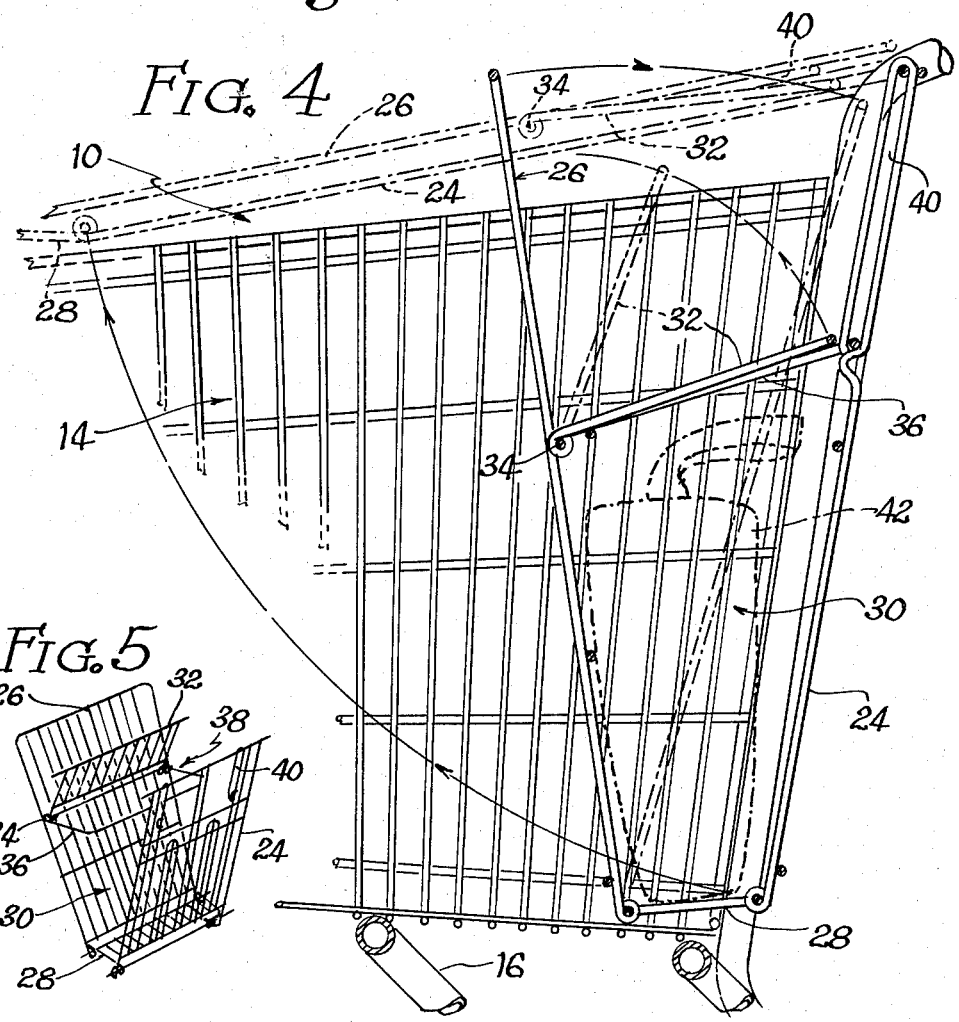

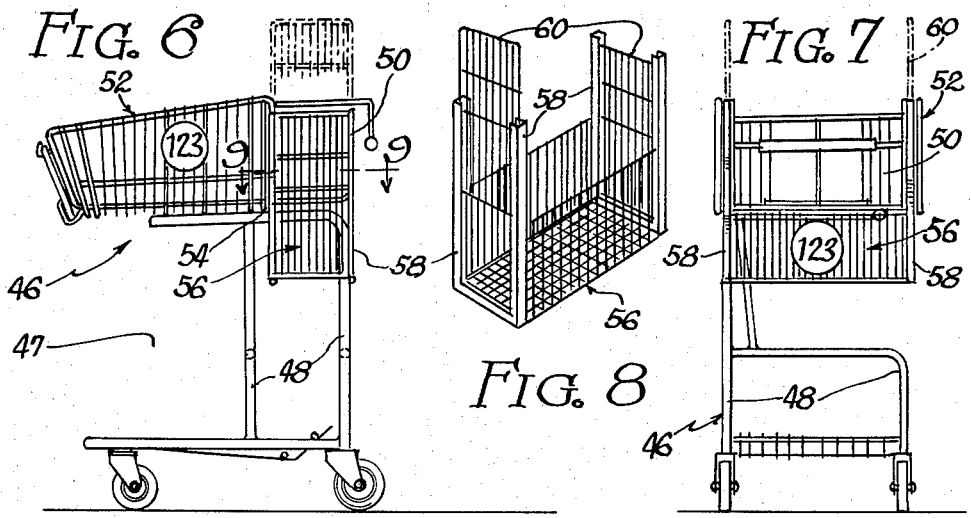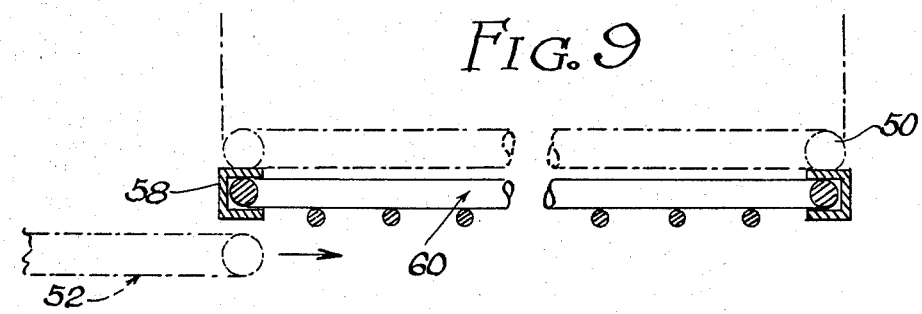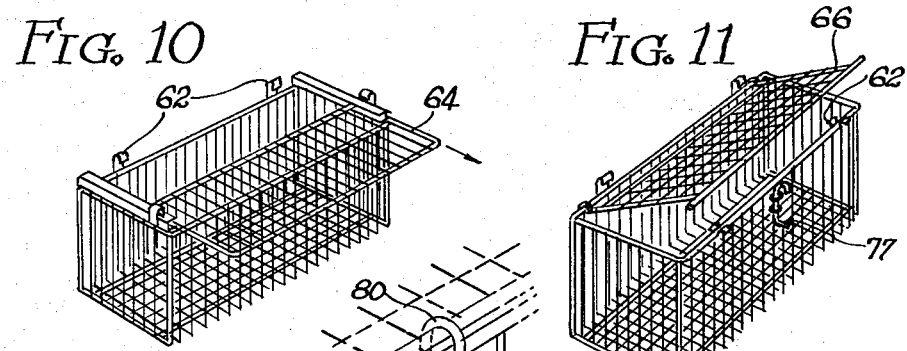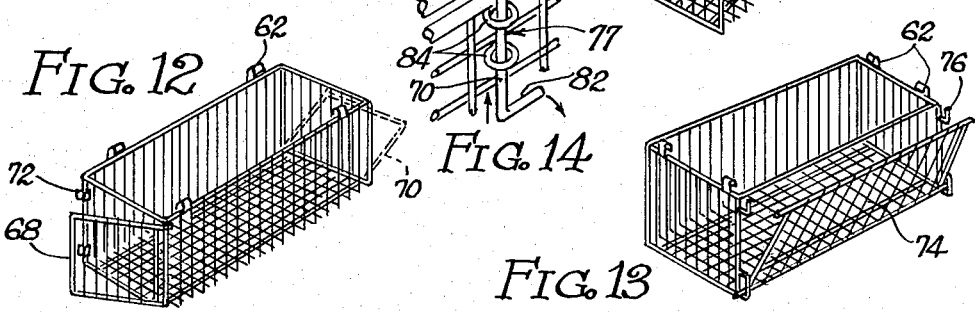

GROCERY BASKET WITH ANTI-THEFT COMPARTMENT

BACKGROUND

Purse and wallet snatching in grocery stores and other stores utilizing the prevalent grocery cart is not as uncommon as one might think, two or three such incidents in a day not being a rare occurrence at some stores. A parallel problem that is at least as great as theft itself is the fear of theft in the cart pusher's mind. Because there is no way to enclose a purse in the cart, lady shoppers are afraid to leave the cart and especially in a crowded supermarket where cart traffic jams are a problem, a definite inconvenience is caused by the inability of the shopper to leave the cumbersome cart for a few moments to slip around the other carts in the traffic jam.

Although at least one shopping cart has developed for retaining a purse, such as shown in U.S. Pat. No. 3,263,880, there is no truly secure grid-type compartment compatible to existing grocery cart structure.

SUMMARY OF THE INVENTION

The present invention defines an extension of present grocery cart structure and is provided in two basic embodiments to conform to the structure of the two most commonly used grocery carts. The classical type of cart with flip-up rear grid is modified in the first embodiment of this invention by coupling the bottom of the rear grid, through a short linking grid, to a forward grid which defines a truncated V-shaped compartment which is topped by a swinging access grid openable to define access into the compartment. The entire structure pivots and slides in such a fashion that the compartment collapses against the rear grid when the carts are nested.

In the second embodiment, a grid basket is attached to the bottom of the rear portion of the modern style grocery cart and is accessible through any of the sides or the top which may be slidable or pivotal to act as a doorway into the compartment.

DESCRIPTION OF THE DRAWINGS

FIG. 1 is a side elevational view of a traditional cart with the anti-theft compartment diagrammatical shown;

FIG. 2 is a rear elevation of the rear grid of the compartment;

FIG. 3 is a rear elevation seen along line 3—3 of FIG. 1;

FIG. 4 is a section taken along 4—4 of FIG. 3;

FIG. 5 is a perspective detail of the compartment;

FIG. 6 is a side elevation view of a different style of grocery cart with the modified compartment attached thereto;

FIG. 7 is a rear elevation view taken from the right of FIG. 6;

FIG. 8 is a perspective view of the compartment of FIGS. 6 and 7;

FIG. 9 is a section taken along 9—9 of FIG. 6;

FIG. 10 is a perspective view of a modification of the baskets;

FIG. 11 is yet another slight modification of the lid structure of the basket;

FIG. 12 is a modification of the basket with side wall doors;

FIG. 13 is a modification with an end wall door, and

FIG. 14 is a perspective view of a detail showing a latch.

DETAILED DESCRIPTION

In FIG. 1 a traditionally styled shopping cart 10 is shown having identifying name plate 12 preferably displayed on the side thereof to help the shopper identify her own cart and not walk off with someone else's. This traditional cart has front wall, side wall, and bottom grid structures 14 resting on a frame 16 having wheels 18. The rear portion frame extends upwardly as a tubular member 20 defining push bar 22.

According to conventional push cart construction, a rear grid 24 is pivoted either between the side portions of the grid structures 14 and/or the upper portions of tubular member 20. The bottom of the rear grid 24 traditionally is freed to pivot forwardly so that the carts will nest horizontally, and often there is a forward grid similar to applicant's forward grid structure 26 which defines a baby seat and upper product compartment similar to the one that will be described herein.

In the instant cart, in its preferred embodiment the bottom of the forward grid 26 is not directly pivoted to the bottom of the rear grid 24 as in the conventional construction, but is connected thereto by a pivotal link 28 which forms the compartment 30 between the two grids in the shape of a truncated-V.

About ⅔ of the way up these grids an access grid 32 is pivoted at 34 to the forward grid 26. This access grid rests against the two side rods 36 of the bail 38, the rear cross member of which rides in tracks 40 defined in the sides of the rear grid 24, best seen in FIG. 4.

It can thus be seen that the access grid 32 can be raised or lowered at will for the temporary containment of a purse, shown in phantom at 42 in FIG. 4. Once the purse has been placed in the purse compartment 30, grocery items can be put on top of the access grid 32, securely enclosing the purse beyond the reach of the would-be purse snatcher, under the theory that whereas a purse snatcher would readily snatch a purse in a temporarily abandoned cart if it were easily accessible and open to reach, he would be substantially deterred from flinging hot dogs, margerine cartons, heads of lettuce and jelly jars out of the way in order to gain access to the lid which he must open to acquire the purse.

Additionally, some type of latch or lock could be installed to hold the access grid 32 in place in a positive fashion until the shopper was ready to leave, such as the latch to be described in conjunction with the next embodiment. It would even be possible to provide the shopper with a key upon entrance to the store, or to utilize a type of combination lock, even if all the locks on the carts had the same combination, under the theory that the time required to work the lock would be an adequate deterrent to crime.

In addition to the features cited above, as indicated in FIG. 3, the cart could have a baby seat 44 which pivots up against the rear grid 24 in the traditional style. The baby seat could be provided with clips 45 to hold it down against access grid 32 if desired.

Certain modifications of the above described cart within the scope of the appended claims would be the provision for an upwardly sliding rear grid 24, or a portion of the rear grid 24 which would slide upward to provide access, instead of the access 32, which could then be permanently affixed to the bail 38 so it would still slide upwardly to nest, but would not provide access to the underlying compartment. This could be done in such a way that the loading of groceries in the top portion of the cart would prevent the upward sliding of this grid.

Turning now to a second style of embodiment, the type shown in FIGS. 6 and 7 was designed to permit the shopper easy access to all areas of the basket without bending over, while simultaneously expanding the lower area 47 end which holds large items. This type of cart, indicated at 46, is also designed around a certain style check-out counter so that the top portion actually passes over the counter surface.

This style cart has a frame 48 with a fixed rear basket portion 50 and frontal basket portion 52 which pivots at 54 upright so that the carts can be stacked horizontally much as the first described cart is nested. When the front portion 52 is swung back rearward, its side walls pass outside of the side walls of the rear basket portions 50.

It is the intent of the instant invention to affix a basket 56 just beneath the rear portion of the existing basket 50. Several embodiments of this first basket are shown, the first, illustrated in FIGS. 6 through 9, show the basket as having side tracks 80 which are mounted to the frame members of the rear basket portion 50 and in which slide access gates 60. This basket is thus accessible from the sides, beneath the fixed rear basket portion 50. The tracks 58 could be modified to represent instead rods, with the access gates 60 modified to define eyelets which are engaged on the rods, to conform more closely to the wire structure utilized in construction with the rest of basket.

Modifications of this under-slung basket are shown in FIGS. 10 through 13, all of which show baskets having clips 62 which can be bent or snapped around the wire members of the bottom of the rear portion of 50 of the existing basket structure. The embodiments of FIGS. 10 and 11 utilize a sliding and pivoted top access grid 64 and 66, respectively, both of which also double as bottom of the open-bottom rear basket 50. In the embodiments of FIGS. 12 and 13, the existing bottom of the basket 50 remains in place, with these baskets being open-topped and providing access by pivoted side grids 68 and 70, which are actually alternatives shown on the same device, one having a horizontal and the other having a vertical axis and both being retained by clips 72. The embodiment of FIG. 13 has a rear swing-down tail gate 74 engageable at the top on hooks 76.

In all the embodiments shown, some type of secure lock may be provided as discussed above, although the mere containment of a purse or wallet inside a compartment rather than being resting completely clear within the basket would offer a great deal of determent.

One example of a latch is illustrated in FIGS. 11 and 14 at 77 wherein a bar 78 with a latch 80 and finger bar 82 slides in retainer rings 84. This latch will work on any of the embodiments disclosed with little or no modification.

I claim:
1. In a shopping cart having a front and side walls and a bottom, an anti-theft compartment comprising:
   (a) a rear grid pivoted at its top about an axis spanning between said side walls;
   (b) enclosure means mounted on said grid to define therewith an enclosed compartment for the temporary containment of valuables;
   (c) closable access means into said compartment;
   (d) said enclosure means comprising a forward grid pivotally linked to said rear grid along the bottom thereof, and an access grid pivotally mounted to the rear of said forward grid such that said grids all pivot upwardly to permit telescoping of a plurality of said carts; and
   (e) a pivotal link pivotal between and spacing the bottoms of said forward and rear grids.

2. Structure according to claim 1 wherein said rear grid defines a pair of parallel tracks along the upper portions of the edges thereof including a pair of slide rods pivoted at one end to said forward grid and slidably engaged at their non-pivoted ends in said tracks.

* * * * *